(12) United States Patent
Masumura et al.

(10) Patent No.: US 11,794,670 B2
(45) Date of Patent: Oct. 24, 2023

(54) AUTOMOBILE COMPONENT

(71) Applicant: KOTOBUKIYA FRONTE CO., LTD., Tokyo (JP)

(72) Inventors: Tetsuya Masumura, Gyoda (JP); Yuki Miyata, Gyoda (JP)

(73) Assignee: KOTOBUKIYA FRONTE CO., LTD., Tokyo (JP)

( * ) Notice: Subject to any disclaimer, the term of this patent is extended or adjusted under 35 U.S.C. 154(b) by 0 days.

(21) Appl. No.: 17/040,129

(22) PCT Filed: Mar. 29, 2018

(86) PCT No.: PCT/JP2018/013462
§ 371 (c)(1),
(2) Date: Sep. 22, 2020

(87) PCT Pub. No.: WO2019/186970
PCT Pub. Date: Oct. 3, 2019

(65) Prior Publication Data
US 2021/0053511 A1 Feb. 25, 2021

(51) Int. Cl.
*B60R 13/08* (2006.01)
*B32B 3/12* (2006.01)
(Continued)

(52) U.S. Cl.
CPC ............ *B60R 13/0815* (2013.01); *B32B 3/12* (2013.01); *B32B 3/266* (2013.01); *B32B 27/12* (2013.01);
(Continued)

(58) Field of Classification Search
CPC ..................................................... B60R 13/08
See application file for complete search history.

(56) References Cited

U.S. PATENT DOCUMENTS 4,433,021 A 2/1984 Riel
4,465,725 A 8/1984 Riel
(Continued)

FOREIGN PATENT DOCUMENTS

JP S58016850 Y 4/1983
JP H0543198 6/1993
(Continued)

OTHER PUBLICATIONS

International Search report for application PCT/JP2018/013462 dated Mar. 7, 2018.
(Continued)

*Primary Examiner* — Mark Ruthkosky
*Assistant Examiner* — Julia L Rummel
(74) *Attorney, Agent, or Firm* — Howard & Howard Attorneys PLLC (57) ABSTRACT

There is provided an automobile component capable of improving sound absorption performance by damping due to vibration of a thin film as well as reducing weight of the automobile component. An automobile component of the present invention includes a core layer 10 in which tubular cells 20 are arranged in a plurality of rows, and a nonwoven fabric layer 30 on one or both surfaces of the core layer. The cells have closed surfaces 21 and open ends 22 in every other row as cell ends on one surface of the core layer. As cell ends on the other surface of the core layer, the cells have open ends 22 in the rows where the cells have the closed surfaces as cell ends on the one surface, and have closed surfaces 21 in the rows where the cells have the open ends as cell ends on the one surface. The open ends 22 allow the internal space of the cells 20 to be in communication with the outside. A thin resin film layer 40 having a plurality of apertures is provided between the core layer and the nonwoven fabric layer. A ratio S is set so that 0<S<0.3, where
(Continued)

S represents a ratio of an area of the apertures provided in the resin film layer corresponding to an opening defined by the open end to an area of the opening.

3 Claims, 5 Drawing Sheets

(51) Int. Cl.
*B32B 3/26* (2006.01)
*B32B 27/12* (2006.01)

(52) U.S. Cl.
CPC ..... *B32B 2307/10* (2013.01); *B32B 2605/003* (2013.01); *B60R 13/08* (2013.01); *Y10T 428/24149* (2015.01)

(56) References Cited

U.S. PATENT DOCUMENTS

| | | | |
|---|---|---|---|
| 5,022,943 A * | 6/1991 | Zaima | B29D 24/005 156/222 |
| 10,328,659 B2 | 6/2019 | Matsumoto | |
| 2008/0176027 A1* | 7/2008 | Pflug | B31D 3/02 428/116 |
| 2009/0250293 A1 | 10/2009 | Gleine et al. | |
| 2011/0162910 A1* | 7/2011 | Chiou | G10K 11/168 181/290 |
| 2017/0253005 A1* | 9/2017 | Matsumoto | B32B 27/32 |
| 2018/0015710 A1* | 1/2018 | Joslyn | B32B 15/14 |
| 2018/0257196 A1* | 9/2018 | Simpson | B24C 1/04 |

FOREIGN PATENT DOCUMENTS

| | | |
|---|---|---|
| JP | H05345376 | 12/1993 |
| JP | 10962267 A | 3/1997 |
| JP | 2627851 | 4/1997 |
| JP | H09221849 A | 8/1997 |
| JP | 109273243 A | 10/1997 |
| JP | 110245907 A | 9/1998 |
| JP | H11188807 | 7/1999 |
| JP | 3103516 | 8/2000 |
| JP | 2001262772 A | 9/2001 |
| JP | 2002340280 | 11/2002 |
| JP | 2003534979 | 11/2003 |
| JP | 3503829 | 12/2003 |
| JP | 2006103408 | 4/2006 |
| JP | 2006315443 | 11/2006 |
| JP | 2007301888 | 11/2007 |
| JP | 4278677 | 3/2009 |
| JP | 4278678 | 3/2009 |
| JP | 4368399 | 9/2009 |
| JP | 4539294 | 7/2010 |
| JP | 2011180381 A | 9/2011 |
| JP | 2011183585 A | 9/2011 |
| JP | 2013237242 A | 11/2013 |
| JP | 5717745 | 3/2015 |
| JP | 2015074358 A | 4/2015 |
| JP | 5924460 B1 | 5/2016 |
| JP | 2017065026 A | 4/2017 |
| JP | 2017151256 A | 8/2017 |
| JP | 2018194649 A | 12/2018 |
| JP | 3478471 B2 | 3/2019 |
| WO | 2001092086 | 12/2001 |
| WO | 2006053407 | 5/2006 |
| WO | 2010007834 | 1/2010 |
| WO | 2011045364 | 4/2011 |

OTHER PUBLICATIONS

English language abstract not found for JP4368399; however, see English language equivalent WO2006053407. Original document extracted on Sep. 1, 2020, 22 pages.

English language abstract not found for JP2003534979; however, see English language equivalent WO2001092086. Original document extracted on Sep. 3, 2020, 13 pages.

English language abstract not found for JP5717745; however, see English language equivalent WO2011045364. Original document extracted on Sep. 3, 2020, 17 pages.

English language abstract and machine-assisted English translation for JPH 09-62267 A extracted from espacenet.com database on Jun. 23, 2022, 9 pages.

English language abstract and machine-assisted English translation for JPH 09-273243 A extracted from espacenet.com database on Jun. 23, 2022, 6 pages.

English language abstract and machine-assisted English translation for JPH 10-245907 A extracted from espacenet.com database on Jun. 23, 2022, 7 pages.

English language abstract and machine-assisted English translation for JP 2001-26272 A extracted from espacenet.com database on Jun. 23, 2022, 10 pages.

English language abstract and machine-assisted English translation for JP 2011-18038 A extracted from espacenet.com database on Jun. 23, 2022, 14 pages.

English language abstract and machine-assisted English translation for JP 2011-183585 A extracted from espacenet.com database on Jun. 23, 2022, 16 pages.

English language abstract and machine-assisted English translation for JP 2017-065026 A extracted from espacenet.com database on Jun. 23, 2022, 16 pages.

English language abstract and machine-assisted English translation for JP 2017-15126 A extracted from espacenet.com database on Jun. 23, 2022, 15 pages.

English language abstract and machine-assisted English translation for JP 2018-194649 A extracted from espacenet.com database on Jun. 23, 2022, 13 pages.

Machine-assisted English translation for JPS 58-016850 Y extracted from Japanese Patent Office database on Apr. 14, 2022, 7 pages.

English language abstract and machine-assisted English translation for JP 2013-237242 A extracted from espacenet.com database on Apr. 14, 2022, 31 pages.

English language abstract and machine-assisted English translation for JP 2015-074358 A extracted from espacenet.com database on Apr. 14, 2022, 14 pages.

English language abstract for JP 5924460 B1 extracted from espacenet.com database on Apr. 14, 2022, 1 page.

English language abstract and machine-assisted English translation for JP 6478471 B2 extracted from espacenet.com database on Dec. 28, 2022, 18 pages.

English language abstract and machine-assisted English translation for JPH 09-221849 A extracted from espacenet.com database on Feb. 15, 2023, 9 pages.

\* cited by examiner

AUTOMOBILE COMPONENT

CROSS-REFERENCE TO RELATED APPLICATION

This application is the National Stage of International Patent Application No. PCT/JP2018/013462, filed on Mar. 29, 2018, which is hereby incorporated by reference in their entirety.

TECHNICAL FIELD

The present invention relates to an automobile component, and more particularly, relates to an automobile component having sound absorption performance.

BACKGROUND ART

Figure 1:
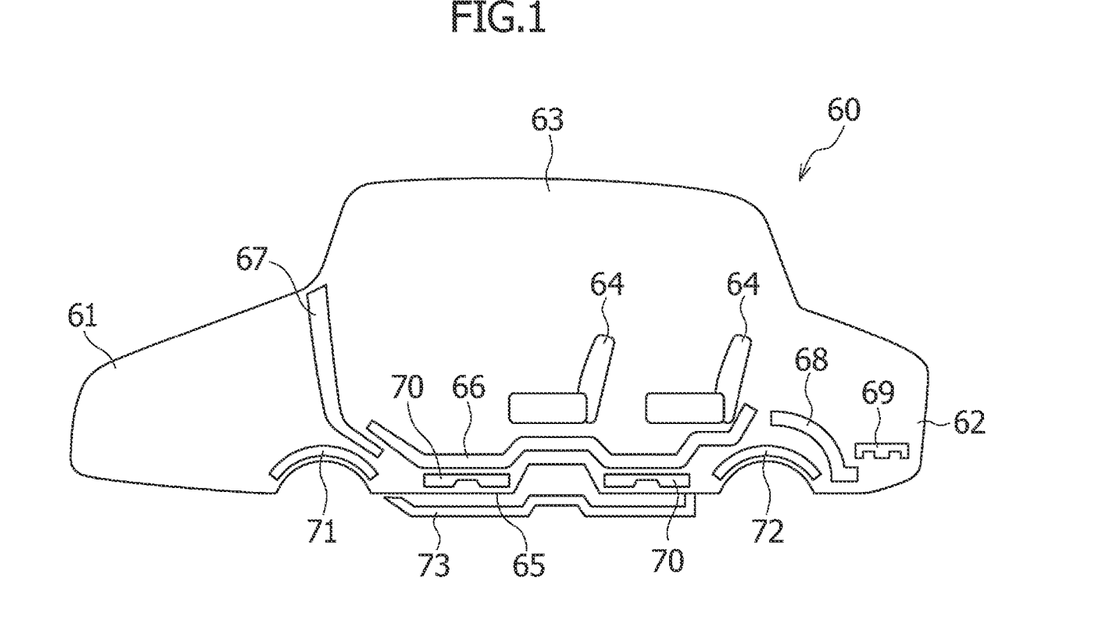
FIG. 1 1 is a schematic view showing various components of an automobile to which an automobile component according to the present invention can be applied.

As shown in FIG. 1, a typical structure of an automobile 60 has an engine compartment 61 provided at the front, a trunk compartment 62 provided at the rear, and a passenger compartment 63 provided in the middle thereof. The passenger compartment 63 is provided with seats 64 such as a driver seat, a front passenger seat, and a rear seat. The passenger compartment 63 has a dash insulator 67, a floor carpet 66, a floor spacer 70, a trunk trim 68, and a trunk floor 69 installed so that they cover the outside of the automobile interior. These components are formed in an uneven shape according to shapes of automobile bodies or designs of components. Furthermore, the exterior under an automobile body 65 has a front fender liner 71, a rear fender liner 72, and an undercover 73, which is formed in an uneven shape for controlling the air flow, installed thereon. For many of these components, a thermoplastic resin is used as a material, and each of the materials is heated and press-molded by a die having the shape of the component to be finished into an uneven-shaped component having a plurality of portions with different thicknesses.

As a recent trend of automobile development, the quietness in the interior of an automobile is emphasized. Noise transmitted to the interior of an automobile includes noise from the windows, noise from the tires, noise from under the automobile body, noise from engine sound, and noise from motor sound. It is said that particularly the frequencies of 1000 Hz to 3150 Hz noise causes annoyance to drivers and passengers. Therefore, the interior and exterior components of automobiles are required to have a function of absorbing noise in this frequency band. On the other hand, it is also important to reduce fuel consumption, and it is also required to reduce weight of interior and exterior components of automobiles.

In addition, JP 4539294 B discloses that, at both ends of a honeycomb core made of non-metal, frequency selection plates with apertures made of light metal are adhered via an adhesive, and fiber reinforced substrates are adhered outside the plates, in which the frequency selection plates transmit or block a specific frequency.

SUMMARY OF THE INVENTION

The frequency selection plate of JP 4539294 B is made of light metal, so a sound damping effect is expected due to the friction of air passing through the aperture of the frequency selection plate, but there is no further effect. On the other hand, when the honeycomb core is covered with a thin film, a damping effect due to the vibration of the thin film can be expected.

Therefore, it is an object of the present invention to provide an automobile component capable of improving sound absorption performance by damping due to vibration of a thin film.

In order to achieve the object, the present invention provides an automobile component having a multilayer structure, comprising: a core layer in which tubular cells are arranged in a plurality of rows; a nonwoven fabric layer located on at least one surface of the core layer, a thin resin film layer having a plurality of apertures between the core layer and the nonwoven fabric layer, wherein each of the cells has a closed surface at one end and an open end at another end, the internal space of the each cell is in communication with the outside by the open end of the cell, the open ends of the cells are arranged on both sides of the core layer such that rows of the open ends of the cells are in every other row, and the apertures are provided so that $0<S<0.3$, where S represents a ratio of an area of the apertures provided in the resin film layer corresponding to an opening defined by the open end to an area of the opening.

The tubular cell may have a polygonal tubular shape such as a substantially quadrangular tubular shape or a substantially hexagonal tubular shape, or may have a curved tubular shape such as a substantially circular tubular shape or a substantially elliptical tubular shape. The open end, the one-side closed surface, and the other-side closed surface may have a polygonal shape such as a substantially quadrangular shape or a substantially hexagonal shape, or may have a curved shape such as a substantially circular shape or a substantially elliptical shape, according to the shape of the cell.

The thin resin film layer may have a thickness in the range of 0.02 mm to 0.60 mm. The thin film layer having apertures may have an aperture rate in the range of 0.2% to 5%. The film layer having the apertures may have a three-layer structure, and the two layers on both surface sides thereof may be adhesive layers. The aperture pattern of the film layer may be a staggered arrangement or a lattice arrangement. The pitch of the apertures of the film layer may be the same as or different from the pitch of the cells of the core layer, and a pitch ratio P/Pc of a pitch P of the apertures of the film layer and a pitch Pc of the cells of the core layer is preferably between 0.25 and 0.8. The pitch ratio may be a pitch ratio in a row direction in which the open end cells or the close surface cells are adjacent or a pitch ratio in a width direction orthogonal to the row direction in which the open end cells or the close surface cells are adjacent. However, the latter is more preferable.

The automobile component according to the present invention may have a shape with portions having different thicknesses, and the maximum thickness portion of the shape may have a thickness in the range of 6 mm to 50 mm.

As described above, the automobile component according to the present invention is an automobile component having a multilayer structure, including: a core layer in which tubular cells are arranged in a plurality of rows; a nonwoven fabric layer located on at least one surface of the core layer, a thin resin film layer having a plurality of apertures between the core layer and the nonwoven fabric layer, wherein each of the cells has a closed surface at one end and an open end at the other end, the internal space of the cell is in communication with the outside by the open end of the cell, the open ends of the cells are arranged on both sides of the core layer such that rows of the open ends of the cells are in every other row, and the apertures are provided so that $0<S<0.3$, where S represents a ratio of an area of the apertures provided in the resin film layer corresponding to an opening defined by the open end to an area of the opening. Thereby, the automobile component can improve the sound absorption performance by damping due to vibration of the thin film.

The aperture rate of the film layer having apertures may be made in the range of 0.2% to 5% so that excellent sound absorption performance can be obtained, which has a peak of a sound absorption coefficient of 0.7 or more in a frequency band of 1000 Hz to 3150 Hz in which the noise is annoying.

The film layer having apertures may have a three-layer structure in which the two layers on both surface sides are the adhesive layers. This allows the adhesive layers to melt and firmly adhere to the core layer or the nonwoven fabric layer while the intermediate layer does not melt, so the hole diameter can be maintained. This can prevent changes in the aperture rate of the film layer to obtain desired sound absorption performance.

DETAILED DESCRIPTION

An embodiment of an automobile component according to the present invention is described below with reference to the accompanying drawings. Note that the drawings are not intended to be drawn to scale unless otherwise specified.

Figure 2:
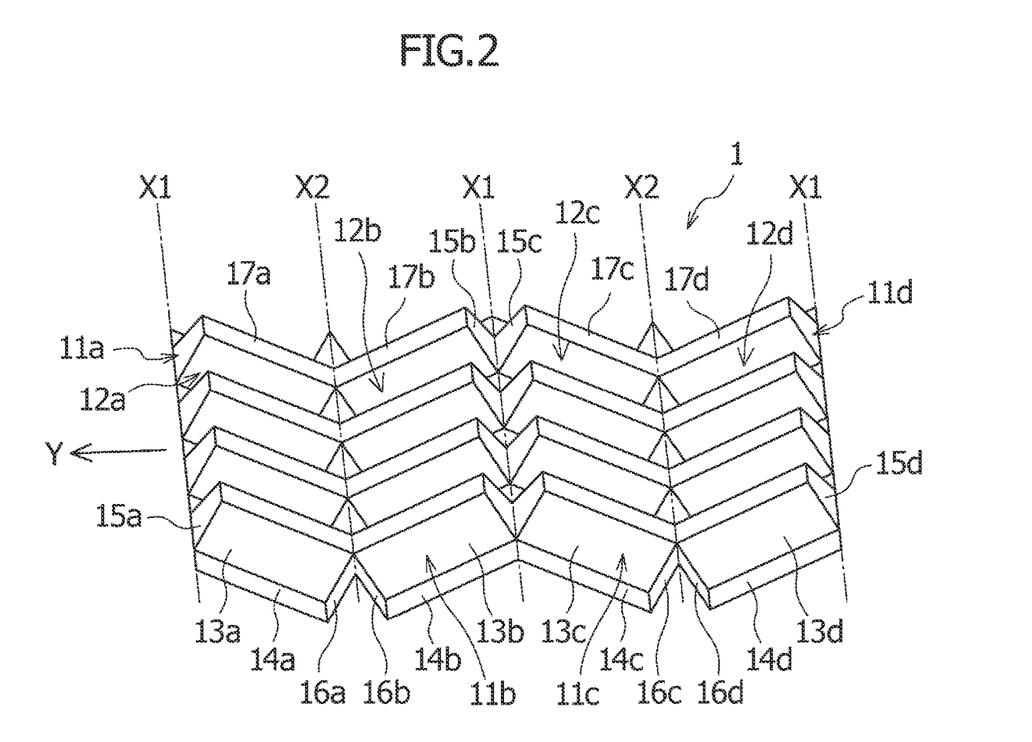
FIG. 2 is a perspective view showing a manufacturing process of a core material used for a core layer in an automobile component according to the present invention.

First, a core layer common to the respective embodiments of the automobile component according to the present invention is described below. FIG. 2 is a perspective view showing a manufacturing process of a core material which becomes the core layer. The manufacturing method of this core material is described in detail in WO 2006/053407 A, which is incorporated herein by reference.

As shown in FIG. 2, a flat material sheet is thermoformed by a roller (not shown) having a predetermined die to be plastically deformed substantially without cutting of the sheet, so that a core material 1 in the figure is formed. The material of the core material 1 to be used can include, for example, a thermoplastic resin such as polypropylene (PP), polyethylene (PE), polyethylene terephthalate (PET), a composite material with fibers, paper, and metal, but it is not limited to these. In particular, a thermoplastic resin is preferable. In this embodiment, a case in which a thermoplastic resin is used is described below. The thickness of the material sheet is preferably in the range of 0.05 mm to 0.50 mm, for example, but it not limited to this, and the thickness of the core material 1 after thermoforming is substantially the same.

The core material 1 has a three-dimensional structure in which ridge portions 11 and valley portions 12 are alternately arranged in a width direction X orthogonal to a manufacturing direction Y. The ridge portion 11 is configured with two side surfaces 13 and a top surface 17 between them, and the valley portion 12 is configured with two side surfaces 13 shared with the adjacent ridge portions 11 and a bottom surface 14 between them. In this embodiment, a case is described in which the shape of the ridge portion 11 is a trapezoid as shown in FIG. 2, but the present invention is not limited to this, and in addition to polygons such as triangles or rectangles, shapes may be curved shapes such as sine curves or bow shapes.

The core material 1 includes the three-dimensional structure continuously in the manufacturing direction Y. That is, as shown in FIG. 2, a plurality of ridge portions 11a, 11b, 11c, and 11d are continuously formed in the manufacturing direction Y. The valley portions 12 are also formed continuously. The connection between the ridge portions 11 and the connection between the valley portions 12 are made by alternately repeating two types of connection methods.

The first connection method is such that, as shown in FIG. 2, on a first folding line X1 in the width direction, top surfaces 17b and 17c of two adjacent ridge portions 11b and 11c are connected, via trapezoidal-shaped ridge portion connecting surfaces 15b and 15c, respectively. The ridge portion connecting surface 15 is formed at a right angle to the top surface 17. On the first folding line X1 in the width direction, the bottom surfaces 14b and 14c of two adjacent valley portions are directly connected. The second connection method is such that, as shown in FIG. 2, on a second folding line X2 in the width direction, bottom surfaces 14a and 14b (or 14c and 14d) of two adjacent valley portions are connected, via trapezoidal-shaped valley portion connecting surfaces 16a and 16b (or 16c and 16d), respectively. The valley portion connecting surface 16 is formed at a right angle to the bottom surface 14. On the second folding line X2 in the width direction, top surfaces 12a and 12b (or 12c and 12d) of two adjacent ridge portions are directly connected.

Thus, the core material 1 has a plurality of three-dimensional structures (the ridge portions 11 and the valley portions 12) connected via the connection regions (the ridge portion connecting surfaces 15 and the valley portion connecting surfaces 16), and has the connection region folded to form a core layer of the automobile component of the present invention. Specifically, the core material 1 is mountain-folded along the first folding line X1 such that the bottom surfaces 14b and 14c of two adjacent valley portions contact back to back with each other, and the angle formed by the ridge portion connecting surfaces 15b and 15c of two adjacent ridge portions increases to 180 degrees. In addition, the core material 1 is valley-folded along the second folding line X2 such that top surfaces 17a and 17b (or 17c and 17d) of two adjacent ridge portions contact face to face with each other, and the angle between the valley portion connecting surfaces 16a and 16b (or 16c and 16d) of two adjacent valley portions increases to 180 degrees. A core layer 10 of the automobile component of the present invention obtained by folding the core material 1 in this manner is shown in FIGS. 3 and 4.

Figure 3:
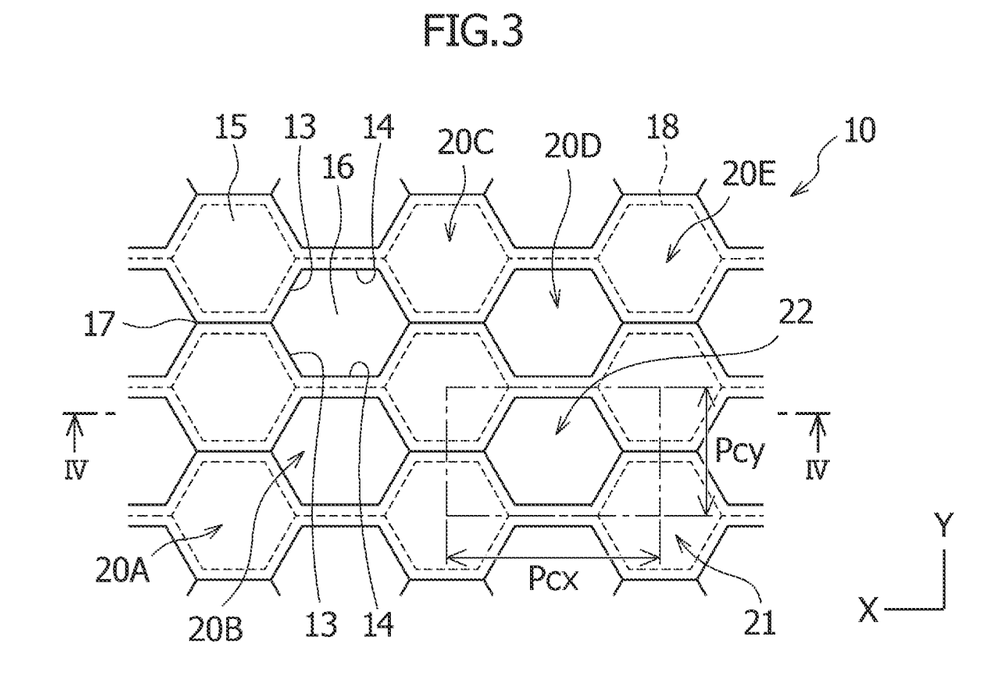
FIG. 3 is a schematic plan view showing a core layer in an automobile component according to the present invention.
Figure 4:
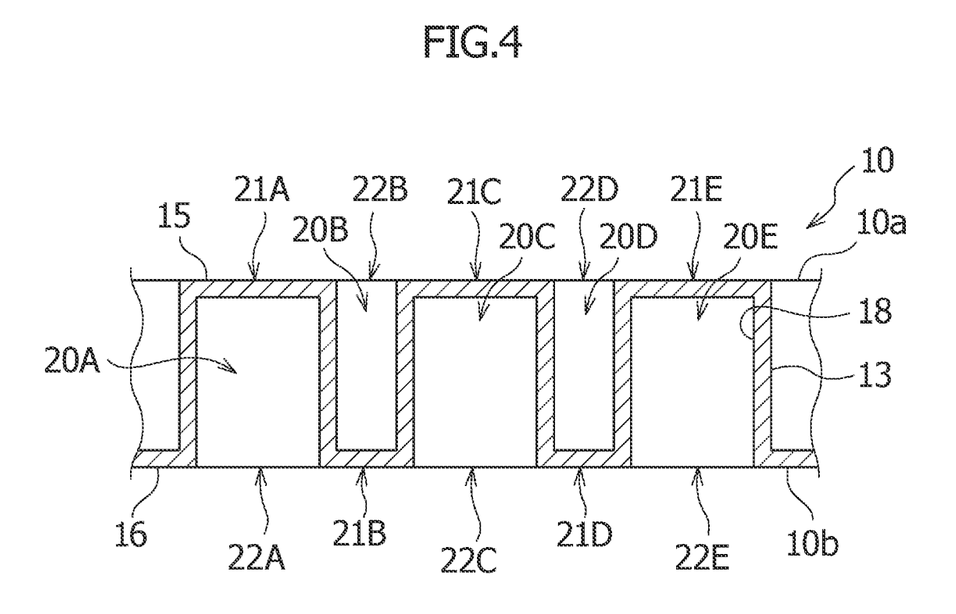
FIG. 4 is a schematic cross-sectional view showing the core layer of FIG. 3 along the line IV-IV.

As shown in FIGS. 3 and 4, the core layer 10 includes substantially hexagonal tubular cells 20 arranged in a plurality of rows, and has cells 20A, 20C and 20E formed out of two adjacent ridge portions and cells 20B and 20D formed out of two adjacent valley portions, each arranged in every other row. A broken line 18 in FIG. 3 is the surface that has been the back surface of the core material, and generally indicates the inner wall of the cell 20 having the substantially hexagonal tubular shape.

The cells 20A, 20C, and 20E formed from the ridge portions includes six cell side walls each forming the substantially hexagonal tubular shape. Each of these cell side walls is formed out of the two top surfaces 17 and the four side surfaces 13 of the cell material. Furthermore, these cells 20A, 20C, and 20E include substantially hexagonal tubular closed surfaces 21A, 21C, and 21E, respectively, to close the cell ends at the cell end on one surface 10a (front surface in FIG. 3) of the core layer 10. Each of these closed surfaces 21 on one side is formed out of two trapezoidal ridge portion connecting surfaces 15 in the cell material. Furthermore, these cells 20A, 20C, and 20E include open ends 22A, 22C, and 22E that are opened in the substantially hexagonal shape at the cell ends on the other surface 10b which is at the opposite side of the core layer 10. The open ends 22A, 22C, and 22E allow the respective internal spaces of the cells 20A, 20C, and 20E to be in communication with the outside.

The cells 20B and 20D formed from the valley portions also includes six cell side walls each forming the substantially hexagonal tubular shape. Each of these cell side walls is formed from two bottom surfaces 14 and four side surfaces 13 of the cell material. Furthermore, these cells 20B and 20D include open ends 22B and 22D that are opened in the substantially hexagonal shape at the cell ends on the one surface 10a of the core layer 10. The open ends 22B and 22D allow the respective internal spaces of the cells 20B and 20D to be in communication with the outside. Furthermore, these cells 20B and 20D include substantially hexagonal tubular-shaped closed surfaces 21B and 21D that close the cell ends, respectively, at the cell end on the other surface 10b, which is at the opposite side of the core layer 10. Each of these closed surfaces 21 on the other side is formed out of the two trapezoidal valley portion connecting surfaces 16 in the cell material.

In this way, the core layer 10 has the one-side closed surfaces 21A, 21C, and 21E formed out of the ridge portions of the cell material in every other row at the cell end on one surface 10a, and has the other-side closed surfaces 21B and 21D formed out of valley portions of the cell material in the different cell rows from the above at the cell end on the other surface 10b. However, unless otherwise stated, both the closed surface 21 on one side and the closed surface 21 on the other side perform substantially the same function.

The thickness of the entire core layer 10 varies depending on which component of the automobile a multilayered structure is used for, so it is not limited to the following. However, from the viewpoint of strength of the core layer 10, sound absorption performance, or weight, it is preferably in the range of 3 mm to 50 mm, and is more preferably in the range of 5 mm to 30 mm.

The basis weight (weight per unit area) of the core layer 10 varies depending on which component of the automobile the multilayered structure is used for, so it is not limited to the following. However, it is preferably in the range of 400 g/m² to 4000 g/m², and is more preferably in the range of 500 g/m² to 3000 g/m². As the thickness of the core layer 10 is greater and the basis weight is greater, the strength of the core layer 10 tends to be higher, and the frequency at which the sound absorption coefficient is at the peak tends to be controllable to lower frequency side, in general.

The basis weight of the core layer 10 can be adjusted by the type of material of the core layer 10, the thickness of the entire core layer 10 or the wall thickness of the cell 20 (thickness of the material sheet) as well as the pitches Pcx and Pcy between the cells 20 of the core layer 10 (distance between the central axes of the cells). In order to set the basis weight of the core layer 10 within the above range, for example, it is preferable that the pitch Pcy between the cells 20 be in the range of 3 mm to 20 mm in the direction in which the cells 20 are adjacent to each other to form a row, which is the core manufacturing direction Y, and it is more preferable that the pitch Pcy be in the range of 4 mm to 15 mm.

Next, individual embodiments of automobile components according to the present invention are described below using the core layer 10 described above.

First Embodiment

Figure 5:
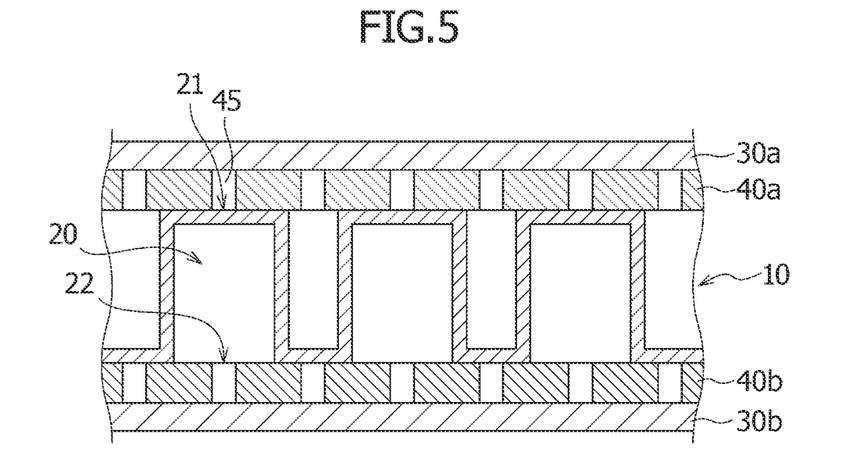
FIG. 5 is a schematic cross-sectional view showing an embodiment of an automobile component according to the present invention.

As shown in FIG. 5, an automobile component of a first embodiment includes the core layer 10 described above, apertured film layers 40a and 40b provided on both side surfaces thereof, and nonwoven fabric layers 30a and 30b respectively provided on further outer sides thereof. Note that FIG. 5 shows a case in which the apertured film layers 40a and 40b are provided on both side surfaces of the core layer 10, but this embodiment is not limited to this. The apertured film layer 40 may be provided only on one surface of the core layer 10. This allows adjusting the degree of blockage of the open end 22 of the core layer 10 to control the sound absorption coefficient of the automobile component.

The material of the apertured film layer 40 to be used may be, for example, resin films such as polypropylene (PP), polyethylene (PE), polyethylene terephthalate (PET) or polyamide (PA), glass films, or aluminum films, but is not limited to these. The thickness of the apertured film layer 40 is, for example, 0.02 mm to 0.60 mm but is not limited to this.

The apertured film layer 40 has a plurality of holes 45 passing through the layer. The holes 45 are made apertured in advance before the apertured film layer 40 is adhered on the core layer 10. For example, it is preferable that the holes 45 be made apertured by hot needle or punching (punching using a male die and a female die) and the hole shape is made to minimize burrs in the hole to prevent the hole from being closed.

Figure 8A:
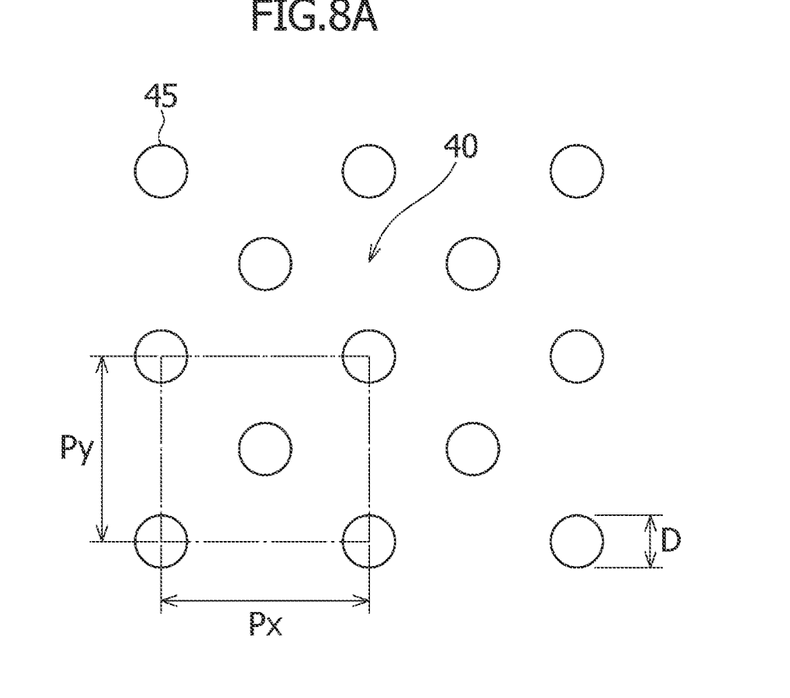
FIGS. 8A and 8B are plan views showing aperture patterns of an apertured film layer in an automobile component according to the present invention.
Figure 8B:
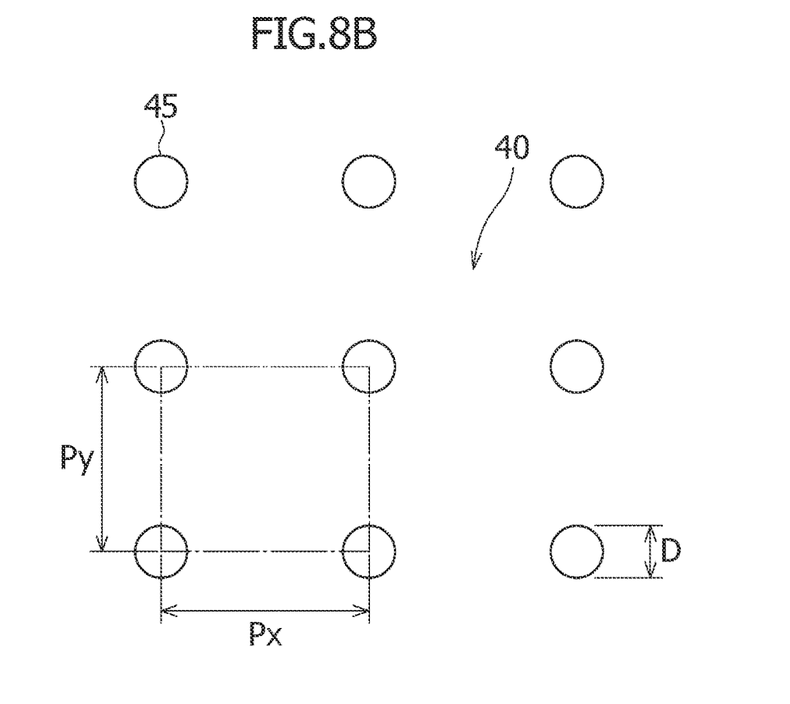

The aperture pattern of the holes 45 of the apertured film layer 40 is preferably a staggered arrangement or a lattice arrangement as shown in FIG. 8A or FIG. 8B. The aperture rate of the apertured film layer 40 is preferably in the range of 0.2% to 5%. As shown in FIG. 8A or FIG. 8B, the aperture rate can be controlled by the pitch Px of the holes 45 in the X direction, the pitch Py of the holes 45 in the Y direction, and the diameter D of the holes 45, where the four holes 45 are surrounded by the smallest rectangle. For example, the aperture rate can be achieved by setting the pitches Px and Py of the holes in the range of 2 mm to 20 mm and the diameter D of the holes in the range of 0.25 mm to 2.5 mm in both the staggered arrangement and the lattice arrangement. In particular, it is preferable that the pitches Px and Py of the holes be in the range of 2 mm to 15 mm and the diameter D of the holes be in the range of 0.3 mm to 2.0 mm. For example, in order that noise that has entered the cell 20 through the holes readily repeats vibration to be damped out in the cell, it is preferable that the apertured film have a size of the holes such that an aperture area S1 of the apertured film layer is smaller than an open end area S2 of the core layer and the ratio S (=S1/S2) of the aperture area S1 of the apertured film layer to the open end area S2 of the core layer is in the range of 0<S<0.3. It is more preferable that there be a range in which this ratio is 0<S≤0.25. The ratio S is not limited to the area ratio in one cell, but may be the average ratio in the area of a plurality of adjacent cells, the area of cells in a row, or the entire area.

The pitches Px and Py of the holes 45 of the apertured film layer 40 and the pitches Pcx and Pcy of the cells 20 of the core layer 10 do not necessarily have to be the same. Also, when the apertured film layer 40 is adhered on the core layer 10, the holes 45 and the cells 20 do not necessarily have to be aligned with each other. This is because the holes 45 of the apertured film layer 40 and the positions of the open ends 22 of the cells 20 of the core layer 10 randomly overlap with each other, so that appropriate communication between the inside and outside is enabled. The pitch of the holes 45 of the apertured film layer 40 is preferably smaller than the pitch of the cells 20 of the core layer 10 in at least either the X direction or the Y direction. Furthermore, the aperture pattern of the film layer of this embodiment is a staggered arrangement or a lattice arrangement, and the pitches Px and Py of the single film are the same. However, there may be another embodiment, from the relationship between the pitches Px and Py of the film alone and the pitches Pcx and Pcy of the cells 20 of the core layer 10, in which the ratio of the pitch (Px/Pcx or Py/Pcy) is preferably 0.25 (25%) to 0.8 (80%), and more preferably 0.35 (35%) to 0.7 (70%), in the core manufacturing direction Y, that is, the direction in which cells are adjacent to each other in a row, or the width direction X orthogonal thereto. More preferably, the pitch ratio (Px/Pcx) may be set in this range in the width direction X, which is orthogonal to the direction in which cells are adjacent to each other in a row. The holes can be more appropriately arranged by setting this pitch ratio. This allows the apertured film layer to have the ratio S of the aperture area S1 set in the range of 0<S<0.3 while reducing the number of holes required at the open end.

For the nonwoven fabric layer 30, it is preferable that at least one of various nonwoven fabrics be used, which include spunbonded, spunlace, and needle punched nonwoven fabrics using a resin such as polyethylene terephthalate (PET), polypropylene (PP), and polyethylene (PE), but are not limited to these. The basis weight (surface density) of the nonwoven fabric is not limited to the following, but is preferably in the range of 10 g/m² to 600 g/m².

Both the apertured film layer 40 and the nonwoven fabric layer 30 with an identical configuration or different configurations may be adhered on both side surfaces of the core layer 10. (The configuration includes the material, the pitch of holes, the film thickness, the non-woven fabric manufacturing method, and the basis weight.)

The automobile component of the first embodiment thus has a multilayer structure including the core layer 10, the apertured film layer 40, and the nonwoven fabric layer 30. The overall basis weight of the automobile component of the first embodiment varies depending on which component of the automobile this multilayered structure is used for. As a result, the overall basis weight is not limited to the following but the range of 450 g/m² to 4500 g/m² is preferable, and the range of 550 g/m² to 3000 g/m² is more preferable. Furthermore, the multilayered structure configured as described above is thermally formed into a predetermined shape of an automobile component such as a trunk trim or an undercover after the respective layers are adhered together. Even after being thermally formed, the multilayered structure also can maintain the predetermined cell configuration of the core layer 10 at a portion having a thickness close to the maximum thickness while it can be formed into a shape having a portion with a different thickness. The maximum thickness portion can have a thickness in the range of 6 mm to 50 mm, for example. The difference between the maximum thickness and the minimum thickness can be in the range of 1 mm to 20 mm for a trunk trim, for example.

According to the first embodiment, the apertured film layer 40 is provided on at least one surface of the core layer 10 having the open ends and the closed surfaces arranged in every other row, and the nonwoven fabric layer 30 is provided on further outer sides thereof, which enables high rigidity as well as weight reduction of the automobile component. In addition, the preformed aperture pattern of the apertured film layer 40 enables easy adjustment and stable maintenance of the degree of blockage of the open end 22 on at least one surface of the core layer 10. Thus, the sound absorption coefficient of the automobile components can be easily controlled within a desired range of 1000 Hz to 3150 Hz.

Second Embodiment

Figure 6:
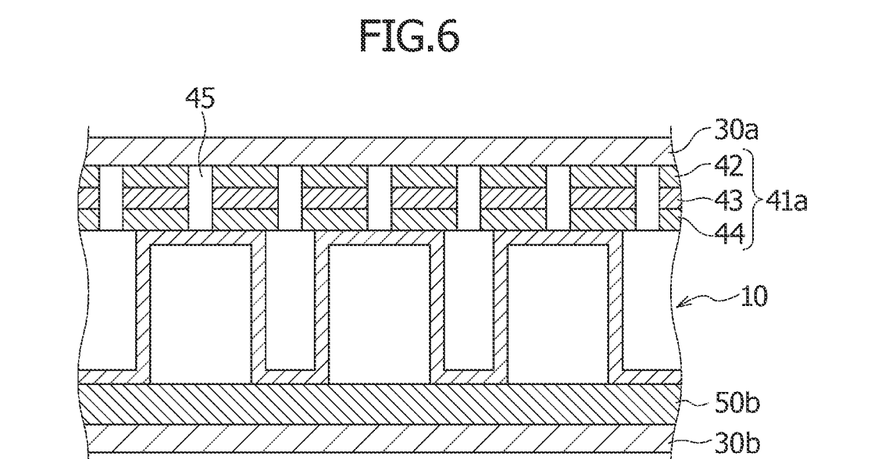
FIG. 6 is a schematic cross-sectional view showing another embodiment of an automobile component according to the present invention.

As shown in FIG. 6, the automobile component of the second embodiment includes the core layer 10 described above, an apertured film layer 41*a* having a three-layer structure provided on one surface of the core layer 10, a non-apertured film layer 50*b* provided on the other surface of the core layer 10, and nonwoven fabric layers 30*a*, and 30*b* provided on further outer sides of these, respectively. The same configurations as those in the first embodiment are referred to by the same reference signs, and detailed descriptions thereof are omitted here.

The apertured film layer 41*a* having a three-layer structure includes a film body layer 43 and two adhesive layers 42 and 44 located on both side surfaces thereof. The holes 45 with a three-layer structure are also made apertured in advance so as to pass through the apertured film layer 41*a* before adhering, in the same way as in the first embodiment, and it is preferable to arrange the holes in a staggered arrangement or a lattice arrangement.

For the material of the film body layer 43, the same material as the material of the apertured film layer 40 described above can be used. For the material of the adhesive layers 42 and 44, a material having a melting point lower than that of the material used for the film body layer 43 is used. For example, polyamide having a melting point of 190 to 220° C. is used for the film body layer 43, polyethylene having a melting point of 90 to 130° C. is used for the adhesive layers 42 and 44, and the temperature at the time of heating to adhere the apertured film layer 40 to the core layer 10 or the nonwoven fabric layer 30, or the temperature for thermoforming into a predetermined shape of automobile component is set to about 150 to 160° C. Thereby the adhesive layers 42 and 44 are melted and firmly adhered on the core layer 10 and the nonwoven fabric layer 30, while the diameter of the hole 45 is readily maintained because the film body layer 43 does not melt. This makes it possible to prevent changes in the aperture rate of the apertured film layer 40 and to obtain desired sound absorption performance for the automobile component. As a resin having a melting point higher than that of polyethylene for the adhesive layer, there is polypropylene in addition to polyamide.

The thickness of each layer of the three-layer structure is not limited to the following, but from the viewpoint of achieving strong adhesiveness and maintaining the hole diameter after melting, it is preferable that the thickness of the film body layer 43 be in the range of 4% to 60% of the thickness of the body of an apertured film layer 41, and the thickness of each of the adhesive layers 42 and 44 be in the range of 20% to 48% of the thickness of the body of the apertured film layer 41 (40% to 96% in total of both adhesive layers), and it is more preferable that the thickness of the film body layer 43 be in the range of 10% to 44% of the thickness of the body of the apertured film layer 41, and the thickness of each of the adhesive layers 42 and 44 be in the range of 28% to 45% of the thickness of the body of the apertured film layer 41 (56% to 90% in total of both adhesive layers).

The non-apertured film layer 50b is the same as the non-apertured film layer described in the first embodiment. Although FIG. 6 shows a case in which the non-apertured film layer 50b is adhered on the other surface, this embodiment is not limited to this, and the apertured film layer 41 with a three-layer structure may be used on both side surfaces of the core layer 10. Furthermore, the non-apertured film layer 50b may have the three-layer structure of the film body layer and the adhesive layers while remaining non-apertured. Furthermore, when the non-apertured film layer 50b is used, the nonwoven fabric layer 30b may be omitted, depending on the material or thickness of the film layer.

The automobile component of the second embodiment has a multilayer structure including the core layer 10, the apertured film layer 41 having a three-layer structure, and the nonwoven fabric layer 30 as described above. The overall basis weight of the automobile component of the second embodiment is preferably in the same range as that in the first embodiment.

According to the second embodiment, the core layer 10 has the open ends and the closed surfaces arranged in every other row, and at least one apertured film layer 41 having a three-layer structure is provided on at least one surface of the core layer 10, and at least one nonwoven fabric layer 30 is provided on further outer side thereof. Thereby, the same effect as in the first embodiment can be obtained, and it is possible to further strengthen the adhesiveness between the apertured film layer 41, and the core layer 10 and the nonwoven fabric layer 30, while the diameters of the holes 45 are kept.

Third Embodiment

Figure 7:
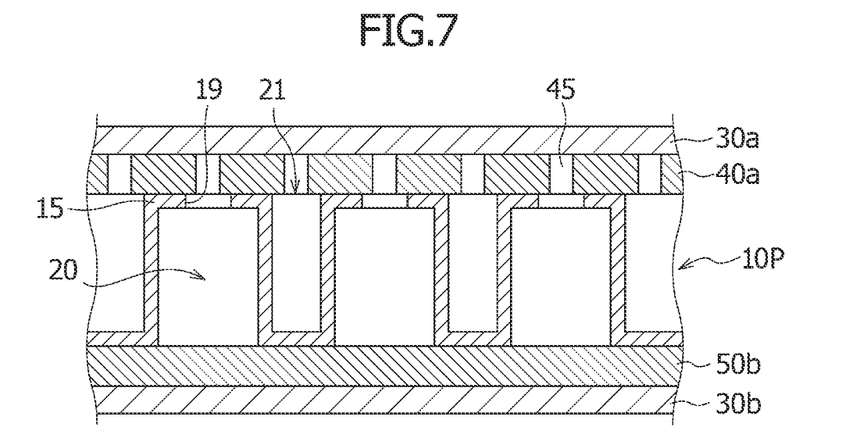
FIG. 7 is a schematic cross-sectional view showing still another embodiment of an automobile component according to the present invention.

As shown in FIG. 7, an automobile component of the third embodiment includes a core layer 10P having a through hole 19 at the closed surface on one side, an apertured film layer 40a provided on the surface side of the core layer 10P having the through holes 19, a non-apertured film layer 50b provided on the other surface side, nonwoven fabric layers 30a and 30b respectively provided on further outer side of these film layers. The same configurations as those in the first and second embodiments are referred to by the same reference signs, and detailed description thereof is omitted here.

The core layer 10P has a through hole 19 at the closed surface 21 of the core layer 10P that allows the internal space of the cell to be in communication with the outside. The through holes 19 are formed by a roller (not shown), or formed in other manufacturing processes of the core material when the core material shown in FIG. 2 is manufactured, and they are preformed before the apertured film layer 40a is adhered. The through hole 19 preferably has a hole shape in which burrs of the hole are minimized to prevent the hole from being blocked.

Basically, the holes 45 of the apertured film layer 40a need to be arranged at the positions of the through holes 19 of the core layer 10P. However, the holes 45 of the apertured film layer 40a do not have to be arranged at the positions of all the through holes 19 of the core layer 10P, and the holes 45 of the apertured film layer 40a may be arranged at the positions of the through holes 19 of at least a part of the core layer 10P. The diameter of the through hole 19 may be larger or smaller than the diameter D of the hole 45 of the apertured film layer 40a and is not limited to the following, but for example, is preferably in a range of 1 mm to 7 mm.

According to the third embodiment, the core layer 10P, with the open ends and the closed surfaces arranged in every other row, has through holes 19 provided in advance in the closed surface 21 on at least one surface of the core layer 10P, and has the apertured film layer 40 provided on the surface of the core layer 10P on the side having the through holes 19, which enables high rigidity as well as weight reduction of an automobile component, and the preformed aperture pattern of the apertured film layer 40 enables easy adjustment and stable maintenance of the degree of blockage of the open end 22 of the core layer 10, and further enables easy adjustment and stable maintenance of the degree of opening of the closed surface 21 of the core layer 10. Thus, the sound absorption coefficient of automobile components can be more easily controlled within a desired range of 1000 Hz to 3150 Hz.

Although FIG. 7 shows a case in which the through holes 19 are provided in the closed surface 21 formed from the ridge portion connecting surface 15, this embodiment is not limited to this. The through holes may be provided in the closed surface formed from the valley portion connecting surface. Furthermore, although FIG. 7 shows a case in which the through holes 19 are provided in the closed surface 21 on one surface side of the core layer 10P, this embodiment is not limited to this. The through holes 19 may be provided in the closed surface 21 on both surface sides. In this case, it is preferable to provide the apertured film layer 40 on both surfaces of the core layer 10P.

FIG. 7 shows a case in which the through holes 19 are provided over the entire closed surface 21 on one surface side, but this embodiment is not limited to this. The through holes 19 may be provided, for example, regularly or irregularly in a part of the closed surface 21 on one surface side. Furthermore, although FIG. 7 shows a case in which one through hole 19 is provided at the center position in the plane of the closed surface 21, this embodiment is not limited to this. For example, one closed surface 21 may be provided with two or more through holes 19 at the center or other positions.

Furthermore, although FIG. 7 shows a case in which the apertured film layer 40 is provided on the surface of the core layer 10P on the side where there are the through holes 19, this embodiment is not limited to this. The nonwoven fabric layer 30a can be directly adhered without the apertured film layer 40 provided. Thereby, the degree of opening of the closed surface 21 of the core layer 10 can be easily adjusted and stably maintained only by the aperture pattern of the through holes 19 of the core layer 10P instead of the aperture pattern of the apertured film layer 40. Therefore, the sound absorption coefficient of the automobile components can be easily controlled within a desired range of 1000 Hz to 3150 Hz.

Examples

Examples and a comparative example of the present invention are described below.

As Example 1, a trunk floor having a multilayer structure shown in FIG. 5 was produced. The core layer was made of polypropylene resin and had a basis weight of 750 g/m$^2$ and a thickness of 10 mm. A resin film layer with apertures having a staggered arrangement and a thickness of 0.1 mm was adhered on the automobile-inner-side of the core layer (the resin film layer being made of a material of polypropylene, having an aperture rate of 0.36%, hole pitches Px of 11 mm, Py of 6 mm, and a hole diameter D of 0.55 mm), and a needle punched nonwoven fabric made of a material of polyethylene terephthalate and a basis weight of 250 g/m$^2$ was further adhered on the resin layer. The same apertured resin film layer as that described above was adhered on the back side of the core layer, and a spunbonded nonwoven fabric made of polyethylene terephthalate and having a basis weight of 50 g/m$^2$ was adhered on the apertured resin film layer. The basis weight of the entire multilayered structure was 1250 g/m$^2$, which was about 37% lighter than the basis weight of the conventional trunk floor of 2000 g/m$^2$. Then, the multilayered structure was heated and press-molded by a predetermined molding die to obtain a trunk floor having portions with different thicknesses of 1 mm to 10 mm.

In order to evaluate the sound absorption performance of the trunk floor of Example 1, a cylindrical sample having a diameter of about 29 mm was taken from a portion of the trunk floor of Example 1 having a thickness of 10 mm, and then the normal incident sound absorption coefficient of this sample was measured at a frequency of 500 Hz to 6300 Hz according to the method conforming to ISO 10534-2 (JIS A 1405). The result is shown in FIG. 9.

Note that, in order to compare the sound absorption performance, a sample (comparative example) was obtained where the sample was a needle punched nonwoven fabric with a basis weight of 900 g/m$^2$ having PET fiber and PP fiber blended, had a thickness of 3 mm, and was used as conventional automobile components. The normal incident sound absorption coefficient of the sample of this comparative example was measured in the same manner as in Example 1. The result is shown in FIG. 9.

Figure 9:
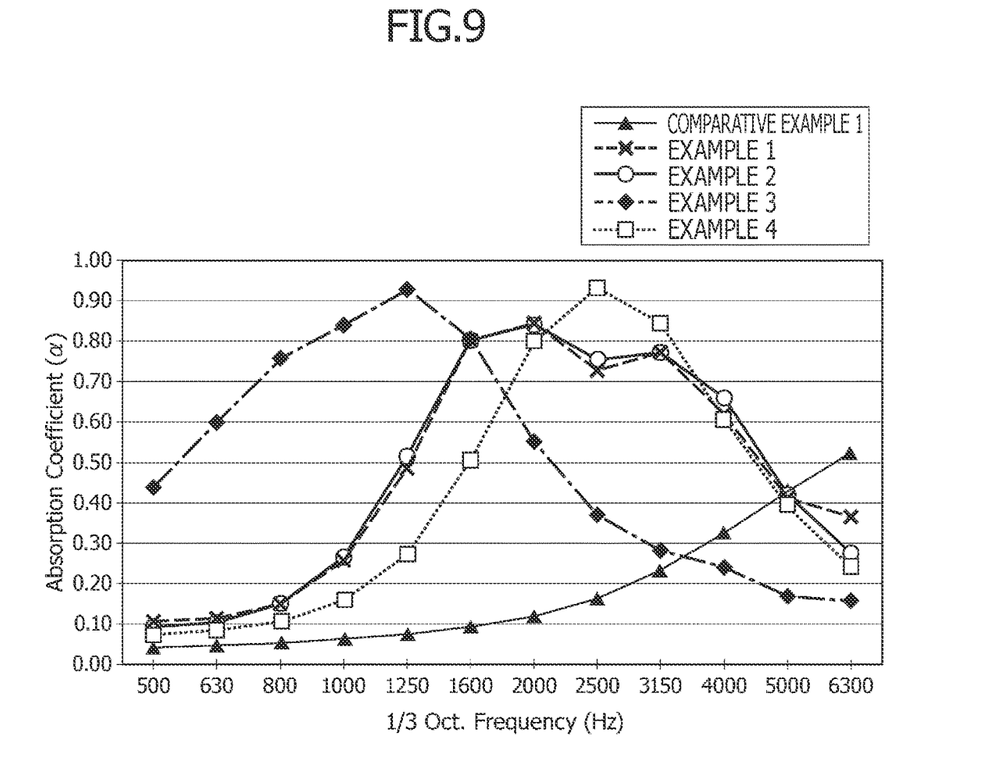
FIG. 9 is a graph showing sound absorption coefficients of examples and a comparative example of automobile components according to the present invention.

As shown in FIG. 9, the peak of the sound absorption coefficient of Example 1 was at a frequency of 2000 Hz, and high sound absorption coefficients could be obtained particularly in the frequency range of 1600 Hz to 3150 Hz. On the other hand, the peak of the sound absorption coefficient of the comparative example is considered to be at a frequency of 6300 Hz or higher, and the sound absorption performance for the frequencies of 1000 Hz to 3150 Hz required for preventing noise in the interior of an automobile was low.

As Example 2, a trunk floor was obtained in the same manner as in Example 1 except for using a non-apertured resin film layer having a thickness of 0.1 mm and made of polypropylene instead of the apertured resin film layer on the automobile-inner-side of the core layer. The normal incident sound absorption coefficient of the trunk floor of Example 2 was measured in the same manner as in Example 1. The result is shown in FIG. 9. As shown in FIG. 9, Example 2 could obtain almost the same sound absorption performance as Example 1, in which Example 2 used an apertured resin film layer on one surface and a non-apertured resin film layer on the other surface while Example 1 used apertured resin film layer on both surfaces.

As Example 3, a floor spacer having a multilayer structure shown in FIG. 5 was produced. The core layer was made of polypropylene resin and had a basis weight of 1850 g/m$^2$ and a thickness of 28 mm. A resin film layer with apertures having a staggered arrangement and a thickness of 0.1 mm was adhered on the automobile-inner-side of the core layer (the resin film layer being made of polypropylene, having an aperture rate of 0.36%, hole pitches Px of 11 mm, Py of 6 mm, and a hole diameter D of 0.55 mm), and a spunlace nonwoven fabric made of a material of polyethylene terephthalate and a basis weight of 50 g/m$^2$ was further adhered on the resin film layer. The same apertured resin film layer and spunlace nonwoven fabric as those described above were also adhered on the back side of the core layer. The basis weight of the entire multilayered structure was 2150 g/m$^2$, which was about 23% lighter than the basis weight of the conventional floor spacer of 2800 g/m$^2$. Then, this multilayered structure was heated and press-molded by a predetermined molding die to obtain a floor spacer having a maximum thickness of 28 mm and portions having different thicknesses.

In the same manner as in Example 1, a cylindrical sample having a thickness of 28 mm and a diameter of about 29 mm was also taken from the floor spacer of Example 3, and the normal incident sound absorption coefficient of the sample was measured. The result is shown in FIG. 9. As shown in FIG. 9, the sound absorption coefficient of Example 3 had a peak at a frequency of 1250 Hz, and high sound absorption coefficients could be obtained particularly in the frequency range of 1000 Hz to 1600 Hz.

As Example 4, a trunk trim having a multilayer structure shown in FIG. 6 was produced. The core layer was made of polypropylene resin and had a basis weight of 750 g/m$^2$ and a thickness of 10 mm. A resin film layer having a thickness of 0.05 mm, apertures in a staggered arrangement, and a three-layer structure, was adhered on the automobile-inner-side of the core layer (the resin film layer having a 0.012 mm-thick polyamide intermediate layer and 0.019 mm-thick polyethylene adhesive layers on the opposite sides thereof, an aperture rate of 2.33%, hole pitches Px of 11 mm and Py of 6 mm, and a hole diameter D of 1.4 mm), and a needle punched nonwoven fabric made of a material of polyethylene terephthalate and a basis weight of 250 g/m$^2$ was further adhered on the resin film layer. A 0.1 mm-thick non-apertured resin film layer was adhered on the back side of the core layer, and a spunbonded nonwoven fabric made of polypropylene and having a basis weight of 50 g/m$^2$ was adhered on the non-apertured resin film layer. The basis weight of the entire multilayered structure was 1200 g/m$^2$, which was about 33% lighter than the basis weight of the conventional trunk trim of 1800 g/m$^2$. Then, this multilayered structure was heated and press-molded by a predetermined molding die to obtain a trunk trim having portions with different thicknesses of 2 mm to 12 mm.

A cylindrical sample having a thickness of 12 mm and a diameter of about 29 mm was also taken from the trunk trim of Example 4 in the same manner as in Example 1, and the normal incident sound absorption coefficient of the sample was measured. The result is shown in FIG. 9. As shown in FIG. 9, the peak of the sound absorption coefficient of Example 4 was at a frequency of 2500 Hz, and particularly high sound absorption coefficients could be obtained in the frequency range of 2000 Hz to 3150 Hz.

From the sound absorption performance test results of Examples 1 to 4, it was confirmed that the sound absorption performance was improved and the peaks having sound absorption coefficients of 0.7 or more could be controlled into the range of 1000 Hz to 3150 Hz, by using the specific multilayer structures of the present invention.

Furthermore, as Example 5, an undercover having a multilayer structure shown in FIG. 7 was produced. The core layer was made of polypropylene resin and had a basis weight of 700 g/m$^2$ and a thickness of 10 mm. The cell pitches of the core layer were 14 mm for Pcx and 8 mm for Pcy. Furthermore, this core layer used was manufactured so that the through holes to make the inside in communication with the outside were formed only on the closed surfaces formed by the ridge portion connecting surfaces of the core material substantially at the centers of the substantially hexagonal-shaped planes. An apertured film layer having a thickness of 0.05 mm, a three-layer structure and apertures arranged in a staggered arrangement was adhered on the road-surface-side of the core layer (the apertured film layer having a film body layer made of a material of polyamide (nylon), and adhesive layers made of a material of polyethylene, an aperture rate of 1.94%, hole pitches Px of 9 mm and Py of 9 mm, and a hole diameter D of 1.0 mm), and a needle punched nonwoven fabric with a basis weight of 200 g/m$^2$ having PP fiber and PET fiber blended was further adhered on the apertured film layer. A 0.1 mm-thick non-apertured resin film layer (made of a material of polypropylene) was adhered on the automobile-body-side of the core layer, and a PET spunbonded nonwoven fabric with a basis weight of 50 g/m$^2$ was adhered on the outside thereof. The basis weight of the entire multilayered structure was 1100 g/m$^2$, which was about 29% lighter than the basis weight of the conventional undercover of 1550 g/m$^2$. Then, this multilayered structure was heated and press-molded by a predetermined molding die to obtain an undercover having portions with different thicknesses of 1 mm to 11 mm.

Figure 10:
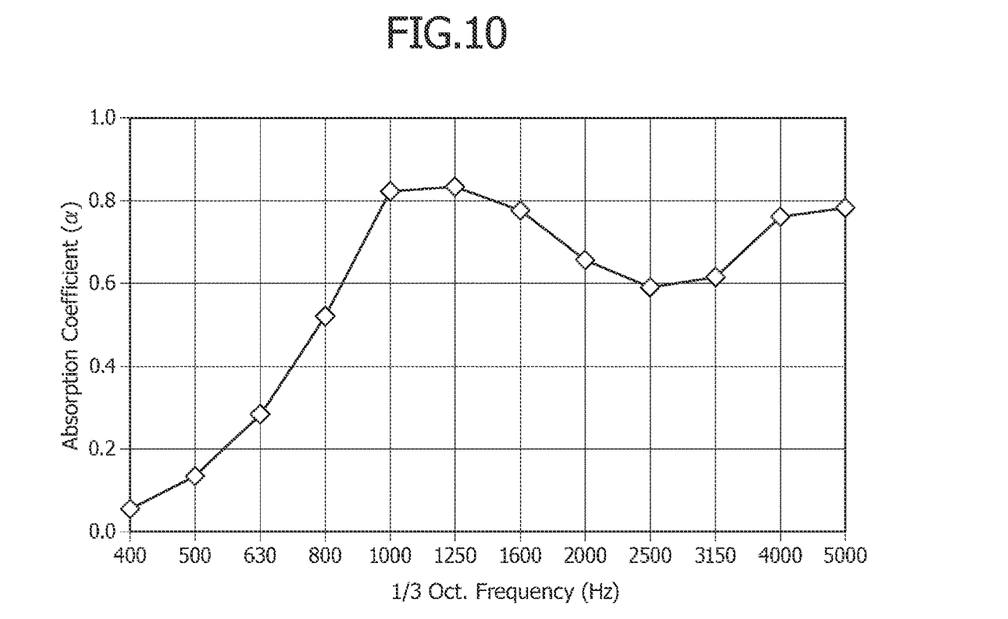
FIG. 10 is a graph showing a sound absorption coefficient of another example of an automobile component according to the present invention.

For the undercover of Example 5, a sample having a thickness of 11 mm before molding and a size of 1000 mm×1000 mm was used, and reverberation chamber sound absorption coefficients at a frequency of 400 Hz to 5000 Hz of the sample were measured according to the method conforming to JIS A 1409. The result is shown in FIG. 10. As shown in FIG. 10, Example 5 is characterized in that it has a first sound absorption coefficient peak at frequencies around 1250 Hz and also has a high sound absorption coefficient peak of 0.7 or more at frequencies around 5000 Hz in a high frequency region.

INDUSTRIAL APPLICABILITY

According to the automobile component of the present invention, the peak of sound absorption coefficient can be controlled within the frequency band of 1000 Hz to 3150 Hz to improve the sound absorption performance, with the weight reduced and high rigidity maintained, by adhering at least one apertured film layer or at least one nonwoven fabric layer. More specifically, the automobile component of the present invention is useful for a sound absorbing cover component of a noise generating source such as a floor carpet, a floor spacer, a trunk trim, a trunk floor, a dash insulator, and an undercover.

The invention claimed is:

1. An automobile component having a multilayer structure, the automobile component comprising:
    a core layer having tubular cells, the tubular cells being arranged in a plurality of rows;
    a nonwoven fabric layer located on at least one surface of the core layer; and
    a thin resin film layer having a plurality of apertures between the core layer and the nonwoven fabric layer, the thin resin film layer being adjacent to each of the core layer and the nonwoven fabric layer, and the thin resin film layer being made of one material selected from the group consisting of polypropylene (PP), polyethylene (PE), polyethylene terephthalate (PET), and polyamide (PA), wherein an aperture rate of the thin resin film layer is in a range of 0.2% to 5%, the aperture rate being a percentage of total open area in the thin resin film layer that is occupied by apertures, and wherein a thickness of the film layer is in a range of 0.02 mm to 0.60 mm;
    wherein each of the cells has a closed surface at one end and an open end at another end, an internal space of the cell is in communication with an outside by the open end of the cell, the open ends of the cells are arranged on both sides of the core layer such that rows of the open ends of the cells are in every other row, and the apertures are provided so that 0<S1/S2<0.3, where S2 represents an area of an opening defined by the open end in the core layer, and S1 represents an area of the apertures provided in the thin resin film layer which are adjacent to the opening of the core layer,
    wherein an aperture pattern of the film layer is a staggered arrangement or a lattice arrangement, and a ratio P/Pc of a pitch P of the apertures of the film layer to a pitch Pc of the cells of the core layer is between 0.25 and 0.8, and
    wherein the ratio P/Pc is a ratio in a width direction orthogonal to a row direction in which the open ends or the closed surfaces of the cells are adjacent to each other.

2. The automobile component according to claim 1, wherein the closed surfaces of at least a portion of the cells arranged in the plurality of rows has a through hole through which the internal space of the cell is in communication with the outside.

3. The automobile component according to claim 1, wherein the automobile component has sound absorption performance in which there is a peak of sound absorption coefficient of 0.7 or more in a frequency band of 1000 Hz to 3150 Hz.

* * * * *